Jan. 11, 1938. E. S. PORTER Re. 20,622
FILM MAGAZINE FOR AMATEUR MOTION PICTURE CAMERAS
Original Filed May 26, 1931 2 Sheets-Sheet 1
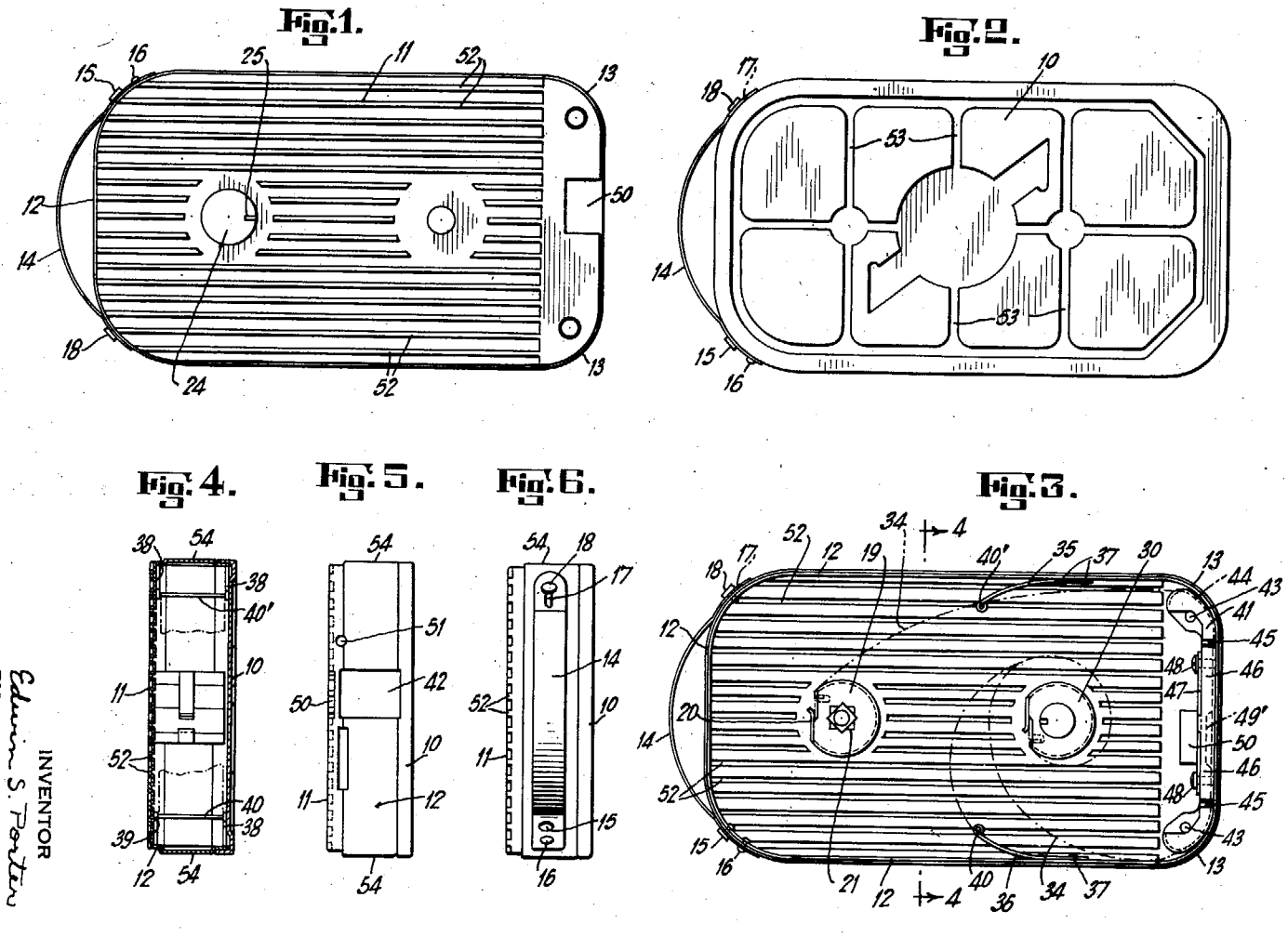
INVENTOR
Edwin S. Porter
BY
Emery, Varney, Whittemore & Dix
ATTORNEYS Jan. 11, 1938. E. S. PORTER Re. 20,622

FILM MAGAZINE FOR AMATEUR MOTION PICTURE CAMERAS

Original Filed May 26, 1931 2 Sheets-Sheet 2

INVENTOR
Edwin S. Porter
BY
Emery, Varney, Whittemore & Dix
ATTORNEYS

Reissued Jan. 11, 1938

Re. 20,622

UNITED STATES PATENT OFFICE 20,622

FILM MAGAZINE FOR AMATEUR MOTION PICTURE CAMERAS

Edwin Stanton Porter, New York, N. Y.

Original No. 1,954,841, dated April 17, 1934, Serial No. 540,050, May 26, 1931. Application for reissue July 21, 1936, Serial No. 91,794

16 Claims. (Cl. 88—17)

This invention relates to improvements in film magazines and more particularly to a novel magazine capable of holding unexposed film in a mounted condition ready for use, and capable of being charged into a camera and discharged therefrom as a unit. One of the advantageous uses is with especial reference to amateur motion picture cameras.

One of the main objects of the invention is to provide a new and novel magazine for holding a charge of film in position ready for exposure and to have such loaded magazine capable of easy shipment and to be of easy carrying size.

A further object of the invention is to provide simple and efficient means whereby the film in the magazine when the magazine is properly inserted in the camera will be absolutely and accurately disposed in the proper position with respect to the camera lenses.

A further object is to provide a new and improved form of driving connection whereby the film may be driven within the magazine after insertion into the camera and to employ for such purpose the intermediary of an improved external driving connection.

A still further object is to provide novel and efficient means whereby the lateral position of the film to insure accurate registration with the magazine aperture can be readily achieved.

Yet a further object comprises the provision of simple and efficient film tensioning and guiding means whereby any sudden strains of moving the film are taken from both the film feeding means and the take up mechanism.

A still further object is to provide simple and efficient means on the exterior of the magazine to insure the disposition of the magazine in fully complete operative picture-taking position within the camera recess especially when the camera door is closed on the magazine after insertion, and at the same time to form a simple means whereby the magazine may be very quickly extracted from the camera when desired.

Further and more specific objects, features and advantages will more clearly appear from a consideration of the specification hereinafter taken in connection with the accompanying drawings which form part of the specification and which illustrate a present preferred form of the invention.

Briefly considered and in general terms the invention concerns an improved magazine for a motion picture camera into which this unitary complete magazine is insertable and from which the magazine is readily removable when the film has been exposed. Such loading may be done at any time at day or night without affecting the film. The magazine is of a type that can be sold as a separate unit from the camera and the purchaser merely has to insert the magazine into the camera in order to make it ready for use. This novel magazine preferably is in the form of a somewhat rectangular casing having top, bottom and lateral walls. The lateral walls are preferably formed in a smooth curve at the corners. The magazine contains a supply reel and a take-up reel, and a stationary gate plate disposed adjacent one wall of the casing which wall has an aperture therein and between which wall and the guide plate the film is adapted to pass as it is moved by the feeding mechanism during the operation of the camera.

A feature of the invention resides in the provision of a resilient element associated with the gate plate to press lightly on the lateral edge of the film so as to predetermine the lateral registration of the film with respect to the aperture opening in the magazine and also to make the movement of the film steadier to prevent flickering on the screen.

The invention further comprises a take-up shaft projecting into the magazine and on which the take-up reel is mounted. This shaft is provided exterior of the magazine with a desired pin device to engage with the corresponding portion of the drive mechanism of the camera. This pin arrangement is provided on one face with a ratchet mechanism cooperating with a spring disposed on the face of the magazine adjacent thereto to permit the drive of the take-up reel in one direction and to prevent its movement in the opposite direction so that when the film is once taken up on the reel it cannot be negligently or accidentally unwound.

The invention further comprises a spring preferably curved as shown, disposed on the rear face of the magazine having a normal position and adapted to be engaged by the door of the camera as the door is closed after the magazine is inserted, thus placing the spring under compression to assist in holding the magazine firmly in position as long as the door is closed. As soon as the door is released the spring pressure naturally snaps the door open and then the spring provides ready means engageable by the hand to quickly withdraw the magazine from the camera.

The invention further comprises suitable spring elements disposed within the magazine and adapted to engage the film to place it under desired tension, especially when films of considerable length are employed. These elements so engage the film that as the film is fed the immediate and first strain of feeding the film past the opening and rolling it up on the take-up reel is somewhat relieved.

The present preferred form of the invention is shown in the drawings, of which:

Fig. 1 is a side elevation of the magazine;

Fig. 2 is a similar elevation of the opposite side of the magazine;

Fig. 3 is an elevation of the magazine as shown in Fig. 2 with the plate removed;

Fig. 4 is a transverse section taken on the line 4—4 of Fig. 3 with the cover in place;

Fig. 5 is a front elevation of the magazine showing the projector opening, the feeding claw opening and the registration pin opening;

Fig. 6 is a rear elevation of the magazine showing the position of the spring;

Figures 7, 8, 9, 10, 11, 12:
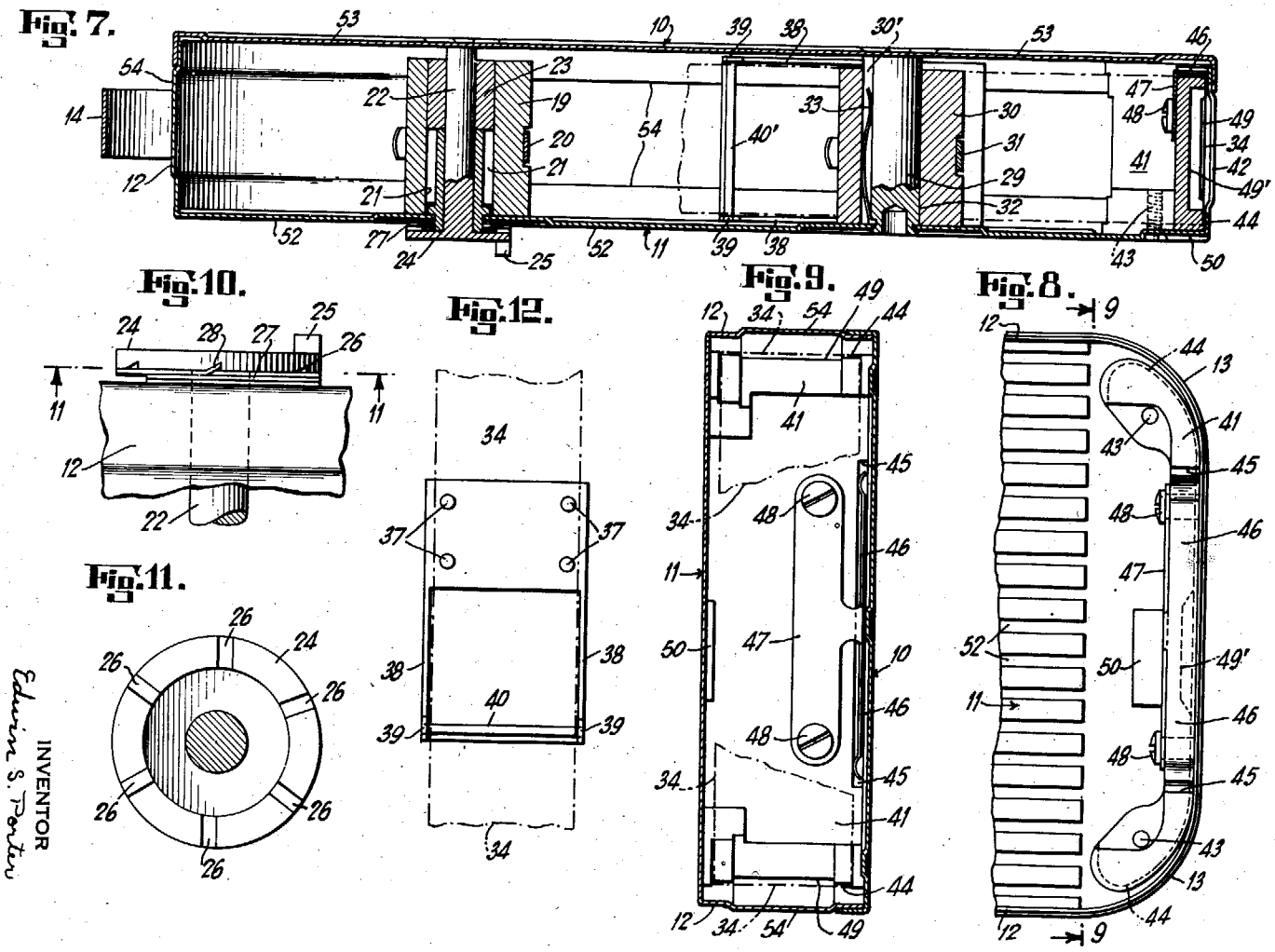
Fig. 7 is an enlarged longitudinal section through the magazine, the view being taken on the line 7—7 of Fig. 3.
Fig. 8 is a partial plan view of the front end of the magazine with the cover removed.
Fig. 9 is a transverse section taken on the line 9—9 of Fig. 8 with the cover in place.
Fig. 10 is a detail of the drive connection for the take-up reel.
Fig. 11 is a section taken on the line 11—11 of Fig. 10.
Fig. 12 is a detail view of one of the film tensioning spring plates.

In the present preferred form of the invention the magazine is adapted to be used preferably in connection with amateur motion picture cameras. The preferred form of camera of this type generally has a magazine receiving recess in line with the camera lens. The magazine is preferably inserted into the recess from the rear of the camera. The improved magazine insertable into such recess is shown in the drawings and comprises top and bottom walls 10 and 11, respectively, and a lateral or side wall 12. This top wall 10 generally is in the form of a cover which is removable to permit the film to be removed and to be threaded and otherwise disposed within the magazine. The side or lateral wall 12 as will be seen from Fig. 3, preferably is formed at the corners in a wide smooth curve indicated by the numeral 13 so as to provide a neat appearing magazine and one which may be slipped readily into and out of the pocket smoothly without any tendency of jamming or tearing the clothing.

At the rear end of the magazine there is provided a type of handle readily grasped to remove the magazine from the camera. The preferred handle constitutes a spring which as well as serving as a handle serves as a means for assisting to hold the magazine in place after the camera door has been closed onto the magazine. Preferably this handle constitutes a curved flat spring plate 14 connected at one end to the lower wall by means of two rivets 15 and 16. By having two rivets the spring is more firmly held in position and lateral deflection thereof is prevented. At the other end of the spring there is provided a suitable means for holding that end of the spring in place. Preferably such means includes a slot 17 in which rides the shank of another rivet 18 to hold this end of the spring in approximate alignment and yet permit longitudinal movement of the spring. As previously stated this spring is engaged or pressed toward the rear face of the magazine by the door of the camera as the door is closed. The force of this spring tends to hold the magazine firmly in operative position within the magazine recess in the camera. When the door is opened this spring forms a ready means to be engaged or gripped by the fingers to remove the magazine from the recess quickly and easily.

Disposed within the magazine is a take-up reel or spool 19 embraced by a film engaging flat spring 20. This spool has a bore 21 to receive a stub shaft 22 which projects into the magazine and is mounted on the bottom wall 11 of the magazine. This stub shaft 22 projects into the casing far enough to be closely adjacent if not actually abutting the cover 10 so as to prevent inward further displacement of the cover which might rub against the edge of the film. The upper end 23 of this shaft is preferably square and adapted to engage with the serrated opening or bore 21 of the supply spool. On the outside of the magazine this drive is in the form of a disk or plate 24 having a projecting drive pin 25. One or more of these drive pins may be included if desired.

In cameras it is desired that exposed film shall not be allowed to return to a position in front of the exposure aperture, and for this reason the take-up spool shall not be allowed to turn backward. Any suitable means may be employed for this purpose. Preferably the inner face of plate or disk 24 is provided with spaced ratchet teeth 26. Beneath this plate there is disposed a flat spiral spring 27 one end of which is an upturned tongue 28 engageable with the ratchet teeth 26 and in such manner as shown in Fig. 10, that the shaft 22 and the plate 24 can be turned in one direction but not in the other. This will permit the take-up spool to be turned in the proper direction to wind up the film thereon but will prevent the film from being unwound therefrom, either intentionally or accidentally.

This mechanism is especially useful when the magazine is taken out of the camera and the drive element of the take-up spool is disengaged from the drive element of the camera, which latter element, of course, is arranged to drive in only one direction. In the particular separable drive connection herein disclosed there is some backlash amounting at most to a part of a revolution, but this in most cases would not permit the take-up spool to turn backward sufficiently to cause any movement of the film at the gate-plate. However, the ratchet mechanism herein provided prevents all appreciable backward turning of the take-up spool, whether the magazine is disposed in the camera or out of it.

The magazine is also provided with a stub shaft 29 fastened to the bottom wall 11 and adapted to receive a supply spool or reel 30 also embraced by a film engaging flat spring 31. The stub shaft 29 also projects inward far enough to lie very closely adjacent the cover 10 in exactly the same manner as the stub shaft 22 and for the same reason. The stub shaft 29 is provided with a groove 30' to receive a flat curved spring 33 fastened to the shaft 29 and tending to press against the inner face of the spool bore 32 to provide suitable frictional resistance to rapid unwinding of the film from the supply spool until the proper pull is exerted on the film. In Fig. 3 the film is indicated by the numeral 34 when it takes a free path and is not threaded around roller 40 as will hereinafter be described.

Within the magazine there are disposed a pair of spring plates 35 and 36 of preferably identical construction fastened to the opposite sides of the lateral wall 12 by means of rivets 37 shown in Fig. 12. Each of these plates has spaced projecting arms 38 the ends of which are turned over as at 39 to form journals for rollers or rods 40 and 40' extending across between these journals and acting as idler rollers or members around which the film 34 passes. As shown in Fig. 3, the film passes from the supply spool 30 in a smooth curve around the rod 40 on one of these plates thence between the gate-plate 41 and the front portion of the lateral wall 12 thence around the rod 40' on the plate 35 and then to and around the take-up spool 19. In the normal position of the film as shown in Fig. 3, the tension of the film will tend to pull the rods and the free ends of the plates away from their lateral wall and the resistance of the free ends of the plates to such displacement as will place the film under tension. For instance, if the claw mechanism, which is usually employed in cameras of this type has pulled the film down past the aperture opening 42 therein the natural tendency of the spring 36 between the roll 30 and the gate plate 41 will tend to move this plate toward the adjacent lateral wall and upon its return due to the springiness thereof, it will pull some of the film off the supply reel so that when the claw action again commences it will not have to pull the whole roll and thus any undue strain will be removed therefrom. Similarly the other plate 35 will automatically operate to keep the film from the gate-plate so that it may be easily wound up on the take-up reel 19.

The spring plates 35, 36 are particularly advantageous when large spools having long lengths of film are employed because the inertia of unwinding film from such large spools is greater and the action of the spring plates serves to ease the burden on the take-up and film feeding mechanism.

Observing Figs. 8 and 9, particularly, it will be seen that the gate-plate 41 is fastened in position by screws 43 preferably to the bottom wall 11. This plate has curved end portions with a depression 44 throughout its length and in which the film passes in a smooth curve.

It is also provided with a narrower and deeper depression 49 extending throughout its length lying beneath the picture portion of the film. Both of these depressions or grooves are clearly shown in Fig. 9. The gate plate also has a recess in the one face thereof indicated by the numeral 45 in Fig. 9 and in this recess is disposed spring arms 46 connected integrally to each other and to plate 47 fastened by screws 48 to the rear face of the gate plate 41 as is also indicated in Fig. 7. These spring arms 46 as shown in Fig. 7 project slightly forward along one lateral edge thereof beyond the front face of the gate-plate so as to contact with the edge of the film 34. This lateral pressure will tend to hold the film in proper lateral position and registration within this shallow groove 44 on the face of the gate-plate 41, which depression is shown in Fig. 7, particularly. A recess 49' is formed in the face of the gate-plate 41 back of the aperture opening 42 in the casing so that in positioning this portion of the film with respect to the lens a certain amount of adjustable movement of the film will be permitted.

In many instances it is desired to have a magazine provided with means for cooperating with an element carried by the camera so that as the magazine is assembled in the camera it will take a proper position. To accomplish this end there is provided a depression 50, Figs. 1 and 5, which depression is of desirable size and depth. This depression receives a tongue carried by the camera. In the event the magazine is not inserted with the right side up, it will not fit and the magazine may be withdrawn and reversed and then properly assembled. Any other satisfactory means of accomplishing this end may be employed.

It will be observed that the film will travel from the supply reel 30 directly to and down across the front face of the gate 41 along the groove 44 therein and will be kept in lateral registration by the spring arms 46. The resistance to movement of the film by the driving mechanism will allow the film to remain in stationary position during exposure. However, the resistance is not entirely relied upon to hold the film in exposure position for it is usual to have a locating pin enter opening 51 to engage one of the sprocket holes and to thereby positively hold the film in position during exposure. This pin is automatically moved back as the film moving claws engage the film.

It will be noticed that the bottom plate 11 has longitudinal ribs 52 therein to stiffen the bottom and that this formation reduces the area of the bottom plate with which the lateral edge of the film may come in contact to reduce the lateral friction on the film. Similarly the cover 10 is provided with ribs 53 to stiffen the same and to reduce the area contacting with the edge of the film for the same reason.

It will also be noted that the lateral wall 12 is provided with a central peripheral bulge or offset 54 to prevent contact between the picture section on the film and the lateral wall. The lateral wall 12 of the casing is made of metal thin enough to be gripped between the fingers to press the lateral walls and spring the metal outwardly away from the gate plate 41 to more readily permit insertion of the film between this portion of the lateral wall and the gate-plate.

The film is held in properly exposed position in respect to the focal length of the lens employed in the camera, i. e., in the focal plane. In the structure herein disclosed the exposure opening 42 receives therein a small frame carried by the camera. The end of the frame is positioned in a plane passing through the focal length of the lens. The film in passing along the groove 44 in gate 41 engages the frame, at the time of exposure thereby being in proper focal position. It will be noted in Fig. 3 that the film is unwound from reel 30 and is straightened out in passing along groove 44 in the gate plate 41, but the tendency of the film is to curl and bulge outwardly and in so doing maintains itself against the frame carried by the camera and received within the aperture opening 42 of the magazine.

The confinement of the edges of the film in the groove 44 between the gate plate and the front wall of the container assists in maintaining the film in proper position.

If desired, a positive means may be employed for holding the film against the frame, the same being disposed in the recess 49' but it has been found that such positive means is not necessary although such positive means has been employed in this type of magazine.

The spring plates 36 by their tensioning effect on the film will take undue strain off the take-up and feeding mechanism as described above. The simple and improved driving connection will permit the film to be taken up on the spool 19 but will prevent motion in the opposite direction. This effect is achieved by the use of ratchet teeth on the drive plate in combination with the flat spring thereunder. The curved spring at the rear end of the magazine tends to keep the magazine properly related to the aperture opening in the camera on the optical axis thereof and affords simple means of permitting the magazine of being quickly removed from the camera when the door on the camera is opened. These simple and efficient means make the magazine and its cooperation with the camera more simple, efficient, and practical as it is obvious from a consideration of the various features.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed is:

1. A removable film carrying magazine for cameras which comprises a magazine casing insertable into a recess in the camera, a spring element on the rear end of the magazine engageable by the door of the camera when the door is closed, to force the magazine into operative position within the camera.

2. A magazine for cameras which comprises a casing, a flat curved spring element on one end thereof adapted to be engaged by a portion of the camera when the magazine is inserted therein to hold the magazine in position within the camera.

3. A film magazine for cameras which comprises a casing containing a film, a curved spring element on the rear face thereof, said element fastened to the casing rigidly at one end and having a sliding connection with the casing at the other end.

4. A film magazine for amateur motion picture cameras which comprises a casing containing film, a curved spring element fastened at one end to the casing along one face thereof, said spring element having a slot in the other end and a pin element on the casing slidable in said slot to permit predetermined movement of the spring element.

5. A film magazine for cameras which comprises a casing, a gate-plate adjacent one wall thereof between which gate and the wall the film passes, spring means on the gate-plate and projecting beyond one edge thereof to engage the lateral edge of the film to hold it in lateral alignment when being exposed, said spring means having two arms connected together and arranged to engage the edge of the film at least at two points, one point of engagement being at one side of the center of the spring means and the other point of engagement being at the other side of the center of the spring means.

6. A film magazine for cameras, said magazine including a casing, a take-up shaft projecting thereinto, a plate on the outer end of said shaft and being located outside the casing and having ratchet teeth on its inner face, and a flat spring disposed on the outside of said casing beneath said plate and having an end portion adapted to engage the teeth and permit only uni-directional movement of the shaft.

7. A film magazine for cameras, said magazine including a casing, a take-up shaft projecting thereinto for receiving a film spool, a plate on the outer end of said shaft and being located outside the casing having ratchet teeth on its inner face, a flat spring disposed on the outerside of said casing beneath said plate having an end portion adapted to engage the teeth and permit only uni-directional movement of the shaft, and a drive pin projecting from the outer face of said plate to engage a mechanism for rotating said take-up shaft.

8. A film magazine for cameras, a magazine including a casing having a base portion with lateral walls and a cover portion, a gate-plate disposed in said base portion adjacent the lateral wall, spring means on the gate-plate adapted to bear against the film passing between the gate-plate and the adjacent wall of the casing, a film supply and take-up spool, spring means disposed adjacent opposite ends of the gate-plate to engage the film and create therein predetermined tension as the film is moved, means projecting from the casing and engaging the take-up spool for driving said spool in only one direction, ribs on the base and cover to strengthen the same, and reduce the lateral area of contact with the film, the lateral wall of the casing being off-set along the center to avoid contact with the picture sections of the film within the casing.

9. A film magazine for cameras, a magazine including a casing having a base portion with lateral walls and a cover portion, a gate-plate disposed in said base portion adjacent the lateral wall, means projecting from the casing and engaging the take-up spool for driving said spool in only one direction, ribs on the base and cover to strengthen the same, and reduce the lateral area of contact with the film, the lateral wall of the casing being off-set along the center to avoid contact with the picture sections of the film within the casing.

10. A film magazine for cameras, a magazine including a casing having a base portion with lateral walls and a cover portion, a gate-plate disposed in said base portion adjacent the lateral wall, spring means on the gate-plate adapted to bear against the film passing between the gate-plate and the adjacent wall of the casing, a film supply and take-up spool, spring means disposed adjacent opposite ends of the gate-plate to engage the film and create therein predetermined tension as the film is moved, means projecting from the casing and engaging the take-up spool for driving said spool in only one direction, ribs on the base and cover to strengthen the same and reduce the lateral area of contact with the film, the lateral wall of the casing being off-set along the center to avoid contact with the picture sections of the film within the casing, a spring device on the rear end of the casing adjustable therein and engageable by a door on the camera when the door is closed to hold the magazine in position, said magazine adjacent the front end thereof having a depression to cooperate with a tongue in the camera and locating the magazine in the camera.

11. A film magazine for cameras, a magazine including a casing having a base portion with lateral walls and a cover portion, a supply spool and a take-up spool in said magazine, a gate-plate disposed in said base portion adjacent the lateral wall, means projecting from the base portion of the casing and engaging the take-up spool for driving said spool in only one direction, ribs on the base and cover to strengthen the same, and reduce the lateral area of contact with the film, the lateral wall of the casing being off-set along the center to avoid contact with the picture sections of the film within the casing, and a plate extending from the adjacent end of the gate-plate to a point toward the take-up spool, said plate lying closely adjacent the wall of the magazine and forming a passage along which the film passes, the end of the latter plate adjacent the take-up spool being of a predetermined flexibility, the film passing over this flexible end and being continuously maintained in a state of tension as it is wound up on the take-up spool.

12. A film magazine for cameras, a magazine including a casing having a base portion with lateral walls and a cover portion, a supply spool and a take-up spool in said magazine, a gate-plate disposed in said base portion adjacent the lateral wall, means projecting from the base portion of the casing and engaging the take-up spool for driving said spool in only one direction, ribs on the base and cover to strengthen the same, and reduce the lateral area of contact with the film, the lateral wall of the casing being off-set along the center to avoid contact with the picture sections of the film within the casing, and plates extending from the adjacent ends of the gate-plate to points toward the spools, said plates lying closely adjacent the walls of the magazine and forming passages along which the film passes, the end of the latter plates adjacent the spools being of a predetermined flexibility, the film passing over these flexible ends and being continuously maintained in a state of tension as it passes between said spools.

13. A film magazine for cameras, a magazine including a casing having a base portion with lateral walls and a cover portion, a supply spool and a take-up spool in said magazine, a gate-plate disposed in said base portion adjacent the lateral wall, means projecting from the base portion of the casing and engaging the take-up spool for driving said spool in only one direction, ribs on the base and cover to strengthen the same, and reduce the lateral area of contact with the film, the lateral wall of the casing being off-set along the center to avoid contact with the picture sections of the film within the casing, and a leaf-type resilient member secured at one end within the magazine and disposed between the end of said gate-plate and one of the spools in said magazine in such position as to form a bent section in said film strip, the film strip passing along a passage at the free end of said resilient member whereby it is caused to maintain its bent disposition and to be maintained under tension for the purposes set forth.

14. A film magazine for cameras, a magazine including a casing having a base portion with lateral walls and a cover portion, a supply spool and a take-up spool in said magazine, a gate-plate disposed in said base portion adjacent the lateral walls, means projecting from the base portion of the casing and engaging the take-up spool for driving said spool in only one direction, ribs on the base and cover to strengthen the same, and reduce the lateral area of contact with the film, the lateral wall of the casing being off-set along the center to avoid contact with the picture sections of the film within the casing, and leaf-type resilient members secured each at one end within the magazine and disposed between the ends of said gate-plate and the spools in said magazine in such position as to form bent sections in said film strip, the film strip passing along passages at the free ends of said resilient members, whereby it is caused to maintain its bent disposition and to be maintained under tension for the purposes set forth.

15. A motion picture film magazine comprising in combination, a casing including a bottom wall, a cover wall, and lateral or side walls, a supply spool and a take-up spool mounted in said magazine, means projecting from one of said walls and engaging the take-up spool for driving said spool in only one direction from mechanism of the camera with which the magazine is adapted to be used, means providing an exposure aperture for a side wall of the magazine, gate means for guiding and supporting a film strip in a predetermined position as it passes said aperture, said gate means including means forming a channel for guiding the film strip beyond the aperture, the walls and guiding means of said magazine principally engaging the side edges of the film strip to minimize contact with the intermediate or picture portion of the film strip, and a leaf-type resilient member secured at one end within the magazine and disposed between the end of said channel and one of the spools in said magazine in such position as to form a bent section in said film strip, the film strip passing along a passage at the free end of said resilient member whereby it is caused to maintain its bent disposition and to be maintained under tension for the purposes set forth.

16. A motion picture film magazine comprising in combination, a casing including a bottom wall, a cover wall, and lateral or side walls, a supply spool and a take-up spool mounted in said magazine, means projecting from one of said walls and engaging the take-up spool for driving said spool in only one direction from mechanism of the camera with which the magazine is adapted to be used, means providing an exposure aperture for a side wall of the magazine, gate means for guiding and supporting a film strip in a predetermined position as it passes said aperture, said gate means including means forming a channel for guiding the film strip beyond the aperture, the walls and guiding means of said magazine principally engaging the side edges of the film strip to minimize contact with the intermediate or picture portion of the film strip, and leaf-type resilient members secured each at one end within the magazine and disposed between the ends of said channel and the spools in said magazine in such position as to form a bent section in said film strip, the film strip passing along a passage at the free end of said resilient member whereby it is caused to maintain its bent disposition and to be maintained under tension for the purposes set forth.

EDWIN S. PORTER.